Aug. 20, 1963    G. J. E. GOUBAU    3,101,472
TRANSMISSION OF ELECTROMAGNETIC WAVE BEAMS
Filed Nov. 21, 1958    3 Sheets-Sheet 1
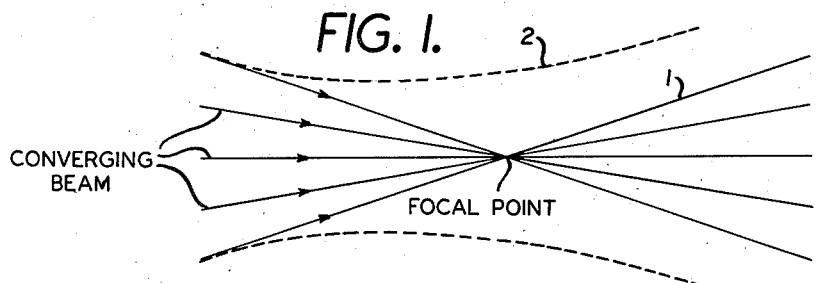
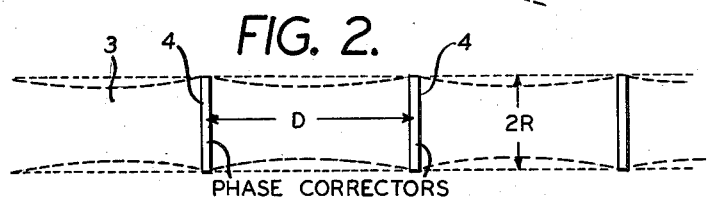
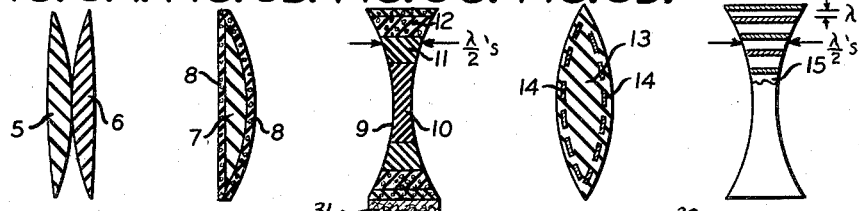
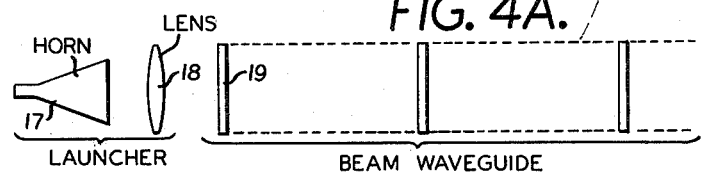
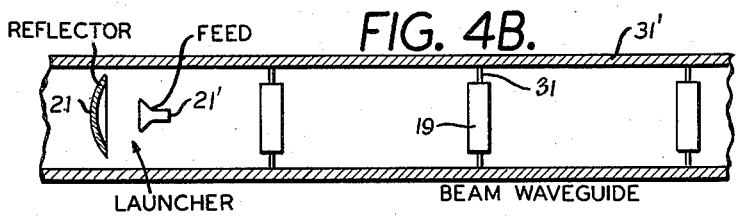
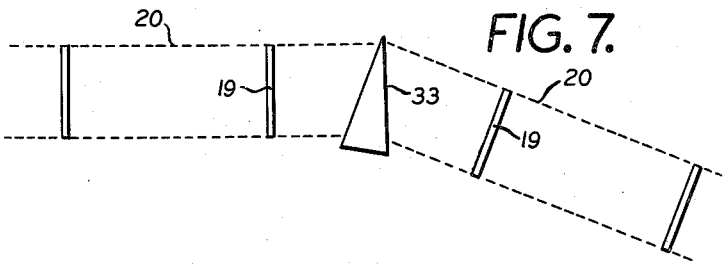
INVENTOR
GEORG J. E. GOUBAU
BY
ATTORNEY

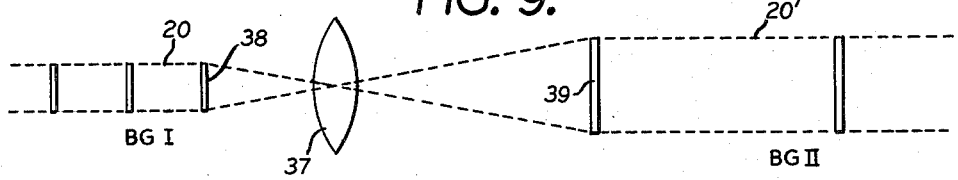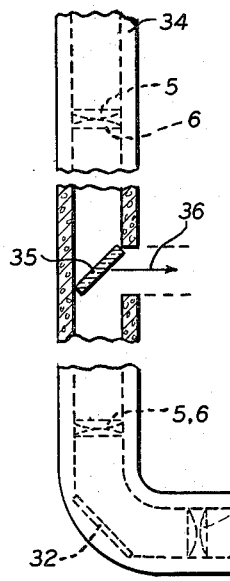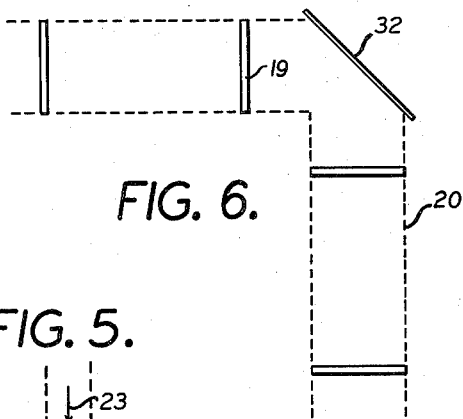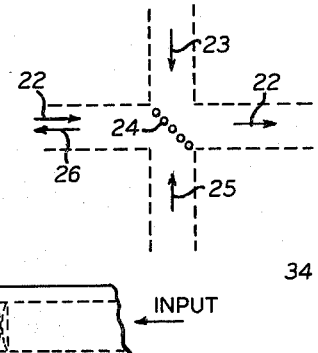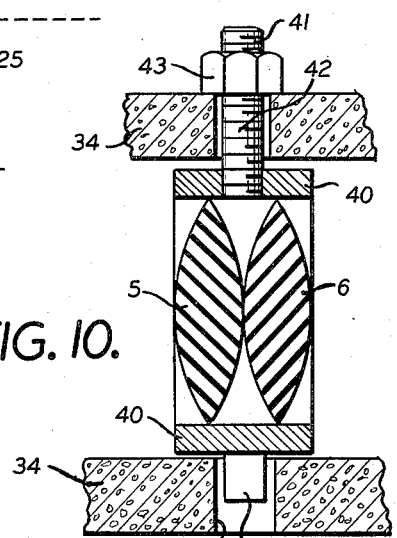

Aug. 20, 1963   G. J. E. GOUBAU   3,101,472
TRANSMISSION OF ELECTROMAGNETIC WAVE BEAMS
Filed Nov. 21, 1958   3 Sheets-Sheet 3

↑ DIRECTION OF ELECTRIC FIELD
--→ DIRECTION OF MAGNETIC FIELD

R = BEAM RADIUS

INVENTOR
GEORG J. E. GOUBAU
BY
ATTORNEY 3,101,472
TRANSMISSION OF ELECTROMAGNETIC
WAVE BEAMS
Georg Johann Ernst Goubau, Eatontown, N.J., assignor to Beam Guidance, Inc., New York, N.Y., a corporation of New York
Filed Nov. 21, 1958, Ser. No. 775,402
40 Claims. (Cl. 343—100)

This invention may be manufactured and used by or for the Government for governmental purposes without the payment to me of any royalty thereon.

This invention relates to electromagnetic waveguides and more specifically to a transmission system for the propagation of a substantially cylindrical wave beam through space.

Presently, the transmission of electromagnetic energy between two places is either done by radiation of the energy through space or by guiding the energy along a wave guide extending between the two points. When transmission by radiation through space is used, the energy is radiated into a certain space angle which is determined by the gain of the transmitting antenna. On the receiving site only a very small portion of the transmitted energy is received, namely essentially the portion which is intercepted by the receiving antenna. Even if the energy is launched as a cylindrical wave beam, the energy spreads out after a short distance and gradually transforms into a conical wave beam. This spread-out of the energy is caused by the optical phenomenon called "diffraction." In the case of guided transmission, the energy is confined within a substantially cylindrical space along the entire path. This is effected either by enclosing the field in a metal tube (closed waveguides) or by applying elongated structures which transmit a surface wave that is a wave whose field is confined to the proximity of the elongated structure within a surrounding cylindrical space having a diameter of the order of usually less than a wavelength. The efficiency of guided transmission is determined by the conductivity and dielectric losses in the materials used for the elongated structure and the degree of confinement of the energy. The efficiency decreases in general with increasing frequency. There are exceptions to this rule, as for instance the $TE_{01}$ circular wave guide whose theoretical efficiency increases with frequency. However, the wave modes used in these exceptional cases are very unstable in that very small deformations of the waveguide upset the wave modes, resulting in substantially increased loss due to mode conversion.

The following invention combines free-space transmission with the principle of guidance in a new transmission means which I call beam waveguide. This waveguide differs from all the other waveguides in that it uses no elongated means. The spreading of the energy is prevented by phase-correcting means which are inverted into the beam at intervals, large compared to the beam radius and very large compared to the wavelength of the transmitted energy. The beam waveguide is particularly efficient in the centimeter and millimeter wavelength range.

It is an object of this invention to provide a method for transmitting electromagnetic energy in which a substantially cylindrical wave beam is guided along a predetermined path by causing appropriate changes of the cross-sectional phase distribution in the beam at intervals large compared to the beam radius to compensate for diffractional expansion of the beam.

A more specific object of this invention is to provide a method for transmitting a substantially cylindrical wave beam by resetting the cross-sectional amplitude and phase distribution of the beam at intervals which are large compared to the radius of the beam.

It is also an object of the invention to provide means for developing a wave beam of many wavelengths in diameter whose cross-sectional phase and amplitude distribution is of such a nature that it can be repeated at intervals large compared to the radius of the beam with a minimum loss of energy.

A further object is phase-correcting elements intercepting the beam to effect the desired repetitions of the cross-sectional amplitude and phase distribution.

A more specific object is phase-correcting elements which cause the beam slightly to converge so that diffraction restores the original beam diameter at the following phase-correcting element.

An even more specific object is the use of phase-correcting "lenses" having preferably a focal length equal to the half-spacing of the lenses. This focal length is so large compared to the radius of the lenses that within the operational wavelength range the image-forming process is essentially governed by the laws of diffraction rather than by geometric optical laws.

A further specific object of the invention is phase-correcting plates of dielectric material, of a thickness to provide the desired phase correction or wave refraction at a minimum loss and having a refraction index decreasing from its center to the periphery approximately according to a square law function.

Still another object of this invention is to provide phase-correcting elements having minimized reflection.

In one embodiment of the invention the phase-correcting means consist of pairs of dielectric identical lenses with appropriate curvatures, arranged back to back to mutually compensate reflections.

As another embodiment of the invention, single type dielectric lenses are made free of reflection by covering their surfaces with a quarter-wave layer of a material having a refractive index equal to the square root of that of the lenses.

A further embodiment of the invention provides a phase-correcting means consisting of a number of stratified dielectrics.

Still further an object of the invention is to provide a waveguide for a linearly polarized radio beam.

In this connection another object of the invention is to transmit two linearly polarized fields simultaneously in directions of polarization which are perpendicular to each other.

Alternatively, as a further object of the invention, two linearly polarized fields are combined into one circularly polarized field.

A more specific object of the invention is to provide field patterns similar to those of the $TE_{01}$ or $TM_{01}$ modes in round wave guides.

It is also an object of the invention to launch and/or receive the energy transmitted by the beam waveguide by means of an electromagnetic cone or horn, and preferably also to combine the cone or horn with one or more phase-correcting means such as dielectric lenses.

In this respect it is another object of the invention to provide a beam launcher or receiver in the form of a parabola reflector with a conventional feed placed off the focal point of the parabola to effect a converging beam.

According to another object of the invention, furthermore, beam waveguides of different cross sections are coupled by providing a magnifying lens forming an enlarged image of the last lens of the smaller beam guide on the plan of the first lens of the larger beam guide.

According to a further object of the invention, the direction of the beam waveguide is changed by inserting a dielectric prism into the wave beam to deflect the beam from the original direction into another direction.

In this connection another object of the invention is to change the direction of the beam by means of reflecting metal plates.

A further object of the invention is to enclose the beam waveguide in a tube of preferably non-conducting material such as concrete and to bury it underground.

These and other objects of the invention will be more fully disclosed with reference to the accompanying drawings.

FIG. 1 shows the effect of diffraction on a converging wave beam.

FIG. 2 illustrates schematically a transmission system embodying certain features of the invention.

FIGS. 3A to 3G show examples of phase-correcting structures.

FIGS. 4A and 4B show examples of launching and receiving structures for a transmission system according to the invention.

FIG. 5 shows the combination of differently polarized beam waveguides.

FIG. 6 shows means for providing deviation from a straight path in a transmission system according to the invention.

FIG. 7 illustrates other means permitting such deviation.

FIG. 8 shows a guide enclosed in a concrete pipe and also shows the tapping of a beam waveguide.

FIG. 9 illustrates the coupling between differently sized beam waveguides.

FIG. 10 shows the mounting of a phase-correcting element at an enlarged scale.

Figure 11:
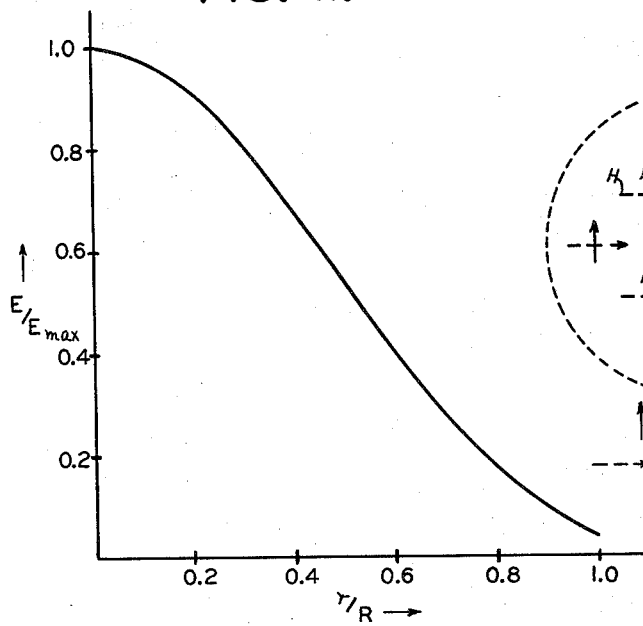

FIGS. 11, 12, 13, and 14 show the cross-sectional field distributions and the corresponding field directions, respectively, for wave beams of different propagation modes.

(A) Principles

It is well known that the wave beam within the Fresnel region of a highly directional antenna, such as a parabolic antenna, is substantially confined to a cylindrical space of the cross sectional dimensions of the antenna. Beyond this region the beam expands and approaches finally the conical distribution which is characteristic for the far field. This expansion of the energy is brought about by the wave optical phenomena called diffraction:

If a beam is considered, which unlike that of an antenna is not parallel but converging, the energy tends to focus in a point. Due to diffraction, however, the cross section of the beam passed only through a minimum before expanding into a diverging beam.

This is illustrated in FIG. 1.

The unbroken lines 1 indicate a focusing beam as it occurs when diffraction is negligible; in other words, when the wave length is infinitely short. The broken lines 2 indicate the envelope of the beam due to diffraction. Actually the energy is not completely confined within this envelope; however, the amount of energy outside this envelope is so small that it may be disregarded.

The expanding portion of a radio beam can be intercepted by appropriately designed phase-correcting means, preferably in the form of a phase-correcting lens or plate which resets the phases in the beam cross section to the values which prevailed at the beginning of the converging portion of the beam.

Thus, after passing such a phase plate, the beam propagates in the same manner as shown in FIG. 1, that is, by causing it first slightly to converge, the diffractive expansion is compensated. This process of reshaping the beam by resetting the phases can be repeated at appropriate intervals.

In this manner, a beam waveguide is obtained as illustrated in FIG. 2.

This beam waveguide behaves similarly to a conventional waveguide but has its energy substantially confined within a predetermined cylindrical space 3 essentially determined by the diameter of phase plates 4.

There are certain field configurations which are exactly repeated at each phase plate. They are mathematically described by functions which form a complete set of orthogonal functions.

Any arbitrary field configuration can be composed of the repetitive ones. The repetitive configurations correspond to the "modes" in conventional waveguides.

In the following when the term "modes" is used with reference to these repetitive configurations, it shall be understood that these "modes" are actually wave bundles, and not like the modes in conventional waveguides or ordinary plane waves characterized by a single propagation constant.

Assuming circular beams of axial symmetry which are polarized in one direction, Fresnel-Kirchhoff diffraction theory yields for the repetitive field configurations the following integral equation:

$$f(r) = p \frac{k}{D} \int_0^R f(\rho) \cdot J_0\left(\frac{kr\rho}{D}\right) \cdot \rho \cdot d\rho \qquad (1)$$

with $$k = \frac{2\pi}{\lambda}$$

In the derivation of this equation, the assumption has been made that the radius R of the beam is very large compared to the wave length $\lambda$ and simultaneously small compared to the distance D between successive phase plates. $J_0$ is the Bessel-function of the order zero. The eigenfunctions $f(r)$ describe the radial distribution of the field intensity and the eigenvalues $p$ give the ratio between the field amplitudes at successive phase plates. The field configuration belonging to the lowest eigenvalue $p$ has the lowest attenuation.

Equation 1 can be transformed into an integral equation with a symmetrical kernel:

$$f(x) = p \cdot \int_0^a f(y) \cdot \sqrt{xy} \cdot J_0(xy) \cdot dy \qquad (2)$$

using the following substitutions:

$$x = \sqrt{\frac{k}{D}} \cdot r \qquad y = \sqrt{\frac{k}{D}} \cdot \rho \qquad a = \sqrt{\frac{k}{D}} \cdot R \qquad (3)$$

Up to date, the lowest eigenvalue of $p$ has been computed for $a = 1.4, 1.6, 1.8,$ and $2.0$. The corresponding values of $p$ are $p_1 = 1.275, 1.118, 1.043,$ and $1.013$, respectively.

Figure 12:
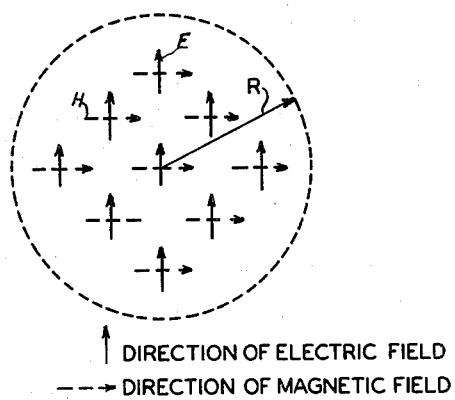
Figure 13:
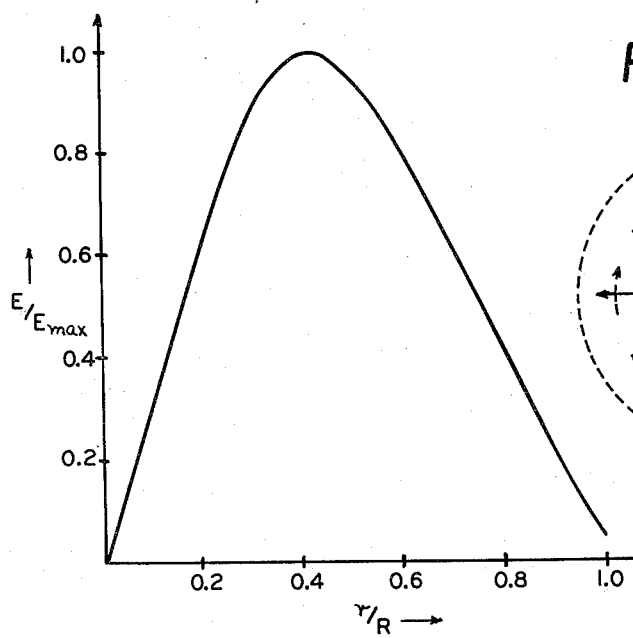
Figure 14:
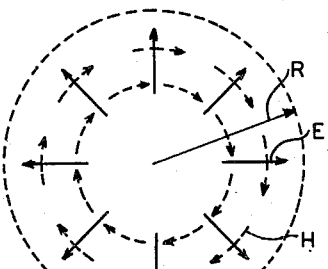

Examples of the cross-sectional field distributions are illustrated in FIGS. 11 to 14. FIG. 11 shows the relative radial intensity distribution for the lowest mode of a linearly polarized wave beam. The corresponding directions of the electric (E) and magnetic (H) field vectors are shown in FIG. 12. FIGS. 13 and 14 illustrate the radial distribution of the field intensity and direction of the field vectors for a beam mode having a field distribution similar to the $TM_{01}$ mode in round waveguide, or the $TE_{01}$ mode if E and H are interchanged in FIG. 14.

It is apparent that in accordance to FIG. 11 which pertains to a preferred embodiment, at the rim of the phase-correcting plate the field is almost zero, i.e., practically the entire energy passes through the lens. According to FIG. 13 the field at the center as well as on the periphery is zero.

Assuming the field configuration of FIGS. 11 and 12 associated with the lowest eigenvalues, $p_1$, the average transmission loss per meter is $$\text{Loss/meter} = \frac{1}{D} 20 \log_{10} p_1 \text{db/m} \qquad (4)$$

or, if D which is measured in meter is expressed in terms of $a, k,$ and R with (3)

$$\text{Loss/meter} = 20 \frac{a^2}{k} R^2 \log_{10} p_1 \text{db/m}.$$

where R and $$\lambda = \frac{2\pi}{k}$$

are measured in meter.

This loss is a diffraction loss which is caused by the fact that a small portion of the energy bypasses the phase plates. Since $a^2 \log p$ decreases with increasing $a$, the diffraction loss is reduced when "$a$" is increased; this means when the distance between the phase plates is smaller. Furthermore, the loss increases with the wave length and decreases with the square of the radius R.

Examples for $a=2$:

$p_1 = 1.013$, $a^2 \log p_1 = 0.022$, Loss/meter $$= 7.0 \times 10^{-2} \frac{\lambda}{R^2} \text{ db/m.}$$

For $\lambda = 1.3 \times 10^{-2}$ m., $R = 0.1$ m.: Loss/meter $= 9.1 \times 10^{-2}$ db/m. $D = 1.2$ m.
$\lambda = 0.3 \times 10^{-2}$ m., $R = 0.3$ m.: Loss/meter $= 0.23 \times 10^{-2}$ db/m. $D = 47$ m.

The phase correction required of the phase plates is given by the approximate formula $$\varphi = \frac{kr^2}{D}$$

where $\varphi$ is the phase advance at a distance $r$ from the axis relative to the phase in the axis. In essence, in this simplified case the phase plates are lenses having a focal length of $$\frac{D}{2}$$

Thus each phase lens images the preceding phase lens into the succeeding phase lens. However, the image-forming process is different from the optical one, because it is not governed by ray-optical considerations. In ray-optics any pattern is imaged into a similar pattern, while in our case only certain field configurations are truly imaged. Ray-optical conditions only prevail if $$\frac{kr^2}{D}$$

is very large compared to 1 while in our case this quantity is a small number.

The lenses used as phase-correcting means can be of conventional type; however, they should be free of substantial reflections. Reflections at the surfaces not only reduce the efficiency of the system but also cause standing waves between the phase plates.

Dielectric lenses with no substantial reflection can be obtained by combining, with their curvatures back to back, two identical dielectric lenses 5 and 6 of appropriate curvatures as shown in FIG. 3A and consist of polyethylene, polystyrene or other wave refractive, low-loss material.

Such compensating lenses as shown in FIG. 3G in an exaggerated scale have preferably instead of smooth curvatures slightly wavy surfaces to effect optimum compensation of reflections. These deviations from the smooth surface are small against wave length in the direction of propagation; and of wave length dimension in a perpendicular direction.

A well known method for rendering single dielectric lenses free of reflection is to cover their surfaces with a quarter-wave layer of a material having a refractive index equal to the square root of that of the lenses.

This is schematically shown in FIG. 3B where a lens 7 consisting of solid polyethylene of appropriate refractive index is provided with layers 8 consisting of less solid or foamed polyethylene or the like material of appropriately reduced index.

Structures with stratified dielectrics may also be used as indicated in FIG. 3C where a lens in the form of a disc 9 is shown consisting of annular layers 10, 11, 12 of different refractive indices gradually decreasing from the center of disc 9 to its periphery, preferably according approximately to a square law function. Thus the various layers may consist of polyethylene or the like material of different consistency, the inner layer 10 for example of relatively dense polyethylene and the outer layer 12 of relatively foamy polyethylene in accordance with the different wave refractive indices desired at these areas. The thickness of disc 9 may also increase with radius as shown in FIG. 3C so as to produce the desired refractions with minimum reflection loss. The thickness preferably is made a wave length or a multiple of half wavelengths as measured within the dielectric material at the particular radius.

Another known method for suppressing reflections in phase correction is to embed partially reflecting layers at appropriate depths underneath the surfaces of phase-correcting lenses; this is schematically indicated in FIG. 3D where a lens is shown consisting of polyethylene or the like and provided with partially reflecting correcting element layers 14 consisting of an array of metal particles or a metal grid.

Alternatively, instead of dielectric phase-correcting means of refracting material in accordance with the invention conductive material in the form of metal tube sections of wave length dimension may be used as shown in FIG. 3E at 15 where the structure is of a curvature opposite to that of the dielectric structures illustrated in FIG. 3D and the diameters of the metal tube section decrease with the distance from the axis.

Still another method is to use phase plates which consist of a stratified dielectric varying in refractions in both radial and axial directions; and composed as shown in FIG. 3F of a number of shell-like layers 16, 16′, 16″, 16‴, etc. of different refraction indices forming a phase-correcting structure gradually varying in both radial and axial directions.

Another means for obtaining phase correction without reflection is in the use of material for which the ratio $\epsilon/\mu$ has the same value as in free space.

A simple construction of phase-correcting means uses uniform but highly foamed dielectric material such as foam polyethylene of a dielectric constant not very different from that of air, for example, 1.1. For materials of such low $\epsilon$ values the reflection is negligibly small. In order to achieve the required phase correction the phase plates have to be made thicker. This in turn reduces the required mechanical accuracy in the shaping process of the surfaces of the phase plates.

Launching and receiving of the energy transmitted by the beam waveguide may be achieved by means of an electromagnetic cone or horn 17 (FIG. 4A) and in order to obtain a converging beam cone or horn 17 is combined with one or more lenses 18 before beaming into phase-correcting structures 19 of beam waveguide 20.

Another beam launcher or receiver is shown in FIG. 4B in the form of a parabola reflector 21 with a conventional feed 21′ being placed off the focal point of the parabola to effect a converging beam.

In general, any beam forming structure may be used for launching or receiving of radio waves if it can be adapted to form a beam of essentially the same structure as the beam transmitted by the beam waveguide.

If the field distribution in the beam deviates from the field distribution of the fundamental "mode" of the beam waveguide, higher modes are developed simultaneously, which, in general, are damped out within a short distance. The loss caused by the mismatch in the field distribution may be considered a launching loss. Launching efficiencies of 80% and better are easily obtained.

(B) *Modifications*

(1) Two linearly polarized fields may be transmitted simultaneously and substantially independently if the directions of polarization are perpendicular to each other. This is illustrated in FIG. 5 where one linearly polarized beam is launched on one end in beam direction 22 and another linearly polarized beam having polarization perpendicular to the original beam may be injected from beam direction 23 by means of a reflector 24 made of parallel wires of less than wave length spacing and oriented perpendicularly to the electric field of the original beam and at an angle of 45° with respect to the axis of the wave beams 22 and 23. Reflector 24 will permit passage of beam 22 and reflect beam 23 into the same direction as 22. Simultaneously an equally polarized beam coming from beam direction 25 may be deflected and propagated into direction 26.

(2) Generally the same or different types and the same or different modes of wave beams may be propagated in opposite directions at the same or different carrier frequencies without substantially affecting each other.

At the same time, different types or different modes of wave beams may be propagated in the same direction on the same or on different carrier frequencies without substantially affecting each other. Furthermore, the same types and same modes of wave beams may be propagated in the same directions on different carrier frequencies without substantially affecting each other.

In this respect for example two similarly linearly polarized wave beams if transmitted in the same direction will be propagated as a single, circularly, or elliptically polarized wave beam without however substantially affecting signals carried on different appropriately spaced carrier frequencies of the different wave beams.

This combination or permutation of the same and different polarizations and of the same and different wave modes, of the same and different propagation directions and of the same and different carrier frequencies, permits a far-reaching exploitation of a common cylindrical space occupied by such wave beams and of the corresponding phase correctors mounted along the space while facilitating at the same time addition and subtraction, injection and extraction from the space of any desired wave beam and of the information data carried thereon, all this within the scope of the present disclosure.

(3) Non-circular beam cross sections may be used.

(4) The phase-correcting means may be mounted in metal, insulating or wave-absorbing means schematically indicated in FIG. 4B at 31 (and the latter, for example, consisting of horse hair, or other natural or artificial fibers, impregnated with carbon black, or the like).

(5) The entire beam waveguide may be enclosed in a dielectric or wave-absorbing tube schematically indicated in FIG. 4B at 31'.

(C) Bends in a Beam Waveguide

Large deviations from a straight path can be made by means of metal reflectors or deflectors as illustrated in FIG. 6 at 32 and arranged in the path of a beam waveguide 20, small deviations are achieved by means of dielectric wedges such as shown in FIG. 7 at 33 arranged in the path of a beam waveguide 20.

FIG. 8 shows a concrete pipe 34 having a beam transmission built-in including phase-correcting plates schematically indicated at 5, 6 and a sharp bend effected through reflecting plate 32. Tapping of the line may be effected by inserting a dielectric plate 35 into the path of the beam and deflecting a predetermined portion in a desired direction 36.

(D) Transition Between Different Beam Cross Sections

The distribution function of the field in a beam waveguide and the diffraction loss per phase-correcting lens characterized by the eigenvalue $p$ remain unchanged if $$\frac{kR^2}{D}$$

is kept constant. If the radii of the lenses are doubled, the distances between the lenses are increased by a factor of 4 and so are the focal lengths of the lenses. Since the loss per lens is unchanged, the average transmission loss per meter is reduced by a factor of 1/4.

The transmission between beam waveguides of different cross sections but identical distribution functions can be achieved as illustrated in FIG. 9 where two beam waveguides 20 and 20' are shown to be connected.

In this case, in accordance with the invention, a magnifying lens 37 is used forming an enlarged image of the last phase corrector 38 of beam waveguide 20 at the plane of the first phase corrector 39 of beam waveguide 20'.

The diameter of lens 37 is made large enough not to introduce any diffraction effects by restricting the passing beam. In other words, lens 37 will operate as an optical lens. In order to obtain the correct phase distribution in the beam of 20' it is necessary to replace the last phase corrector 38 of beam waveguide 20 by a phase corrector of the same diameter as all the other phase correctors of this guide, but of different focal length. The focal length is made so that phase corrector 38 images the plane of the preceding phase corrector of the guide into the plane of magnifying lens 37. Similarly, the first phase corrector 39 of beam waveguide 20' is replaced by one which images the plane of the succeeding phase corrector of this guide into the plane of magnifier 37.

(E) Application of the Beam Waveguide

The beam waveguide appears to be applicable to millimeter wave transmission not only over short but also long distances (see second example in column 5). In this case, the wave beam could be channeled underground through concrete pipes of 1 to 2 feet diameter with phase plates at intervals of 50 to 150 feet.

Theoretical considerations indicate that the accuracy required for the alignment of the phase plates is independent of the wave length and decreases with increasing beam diameter.

Such adjustment is explained in FIG. 10 where a phase corrector 5, 6 is shown mounted on a ring 40 suspended on screw bolt 41 adjustably supported in opening 42 of concrete pipe or tube 34 by means of nut 43. At the bottom, ring 40 is guided by another bolt 44 in another opening 45 of pipe 34.

Generally the beam waveguide should be less costly and less critical in installation than circular waveguide in $TE_{01}$ mode operation which is presently considered for long distance millimeter wave transmission.

The invention is not limited to the particular shape, extension, size, cross section or structure beam waveguide or transmission lines shown or described with reference to the particular beam transmitting, receiving or phase-correcting structures disclosed but may be applied in any form or manner whatsoever without departing from the scope of the invention as claimed herein.

I claim:

1. In a high frequency transmission system, means for producing a free electromagnetic wave beam with substantially planar wave fronts progressing into a predetermined direction, and having at a predetermined point along its path a predetermined cross sectional amplitude and phase distribution, and phase-correcting means arranged across said path at a succeeding point thereof having an aperture radius determined by the square root of the product of wave length and distance between said points to reset the cross sectional phase distribution of said wave beam substantially to the cross sectional phase distribution prevailing at said first point.

2. Transmission system according to claim 1 wherein the predetermined cross-sectional amplitude distribution is a solution of the integral equation $$f(r) = p\frac{2\pi}{\lambda D}\int_0^R f(\rho) \cdot J_0\left(\frac{Kr\rho}{D}\right) \cdot \rho \cdot d\rho$$

where $f(r)$ and $f(\rho)$ are the amplitudes of the wave beam at the distances $r$ and $\rho$ from the beam axis respectively; $R$ is the radius of the beam, $J_0$ the Bessel function of the order zero, $D$ the distance between said two points, $\lambda$ the wavelength and $p$ any eigenvalue of the integral equation.

3. Transmission system according to claim 1 wherein said wave beam producing means include at least one phase-correcting means.

4. System according to claim 1 wherein said phase-correcting means consist of wave refracting means operative over the cross section of said wave beam so as to cause the wave while passing said wave refracting means to be phase corrected by refraction.

5. System according to claim 4 wherein said wave refracting means comprise a dielectric lens having a focal length, if considered as a lens operating at wave lengths substantially below said aperture determining wave length, which is approximately half of said distance between successive phase-correcting means.

6. System according to claim 4 wherein the ratio of the square of the radius and said product is of the order of one.

7. Transmission system according to claim 1 wherein said phase-correcting means are of circular structure defining a cylindrical space within which said wave beam is to be confined.

8. In a high frequency transmission system, means for producing an electromagnetic wave beam with substantially planar wave fronts progressing along a substantially linear path, and a number of phase-correcting means arranged in the path of said wave beam at the expanding cross sections thereof and having apertures determined by the product of wave length and distance between phase-correcting means to reset phases in said cross sections to original distribution prevailing at preceding cross sections.

9. Transmission system according to claim 8 wherein said wave beam has a radius which is large against wave length, with a distance between phase-correcting means which is also large against wave length, increasing with decreasing wave length.

10. Transmission system according to claim 8 wherein said wave beam has a radius which is large against wave length, with a distance between phase-correcting means which is proportional to the square of said radius and inversely proportional to the wave length.

11. Transmission system according to claim 10 wherein at the centimeter and millimeter range of operating wave lengths the distance is about at least 100 times wave length.

12. Transmission system according to claim 8 wherein said phase-correcting means are in the form of wave refracting phase plates having such focal length, if considered as a lens operating at wave lengths substantially below said aperture determining wave length, that each of said plates images the preceding plate into the succeeding plate.

13. Transmission system according to claim 8 wherein said phase-correcting means are in the form of pairs of identical biconvex dielectric phase plates each phase plate having differently curved surfaces, and the phase plates of each pair being arranged with their more curved surfaces facing each other.

14. Transmission system according to claim 8 wherein said phase-correcting means comprise single dielectric phase plates having surfaces covered with a quarter-wave layer of a material having a refractive index equal to the square root of that of the phase plates.

15. Transmission system according to claim 8 wherein said phase-correcting means comprise phase plates each consisting of a number of stratified dielectrics.

16. Transmission system according to claim 8 wherein said phase-correcting means comprise dielectric phase plates having embedded therein partially reflecting layers at appropriate depths underneath the surfaces of said phase plates.

17. Transmission system according to claim 8 comprising in addition to said wave beam producing means, wave beam receiving means, at least one of said means including a parabola reflector with a conventional feed placed off the focal point of the parabola to produce a converging beam.

18. Transmission system according to claim 8 wherein said wave beam producing means include means for producing field patterns similar to those of the $TE_{01}$ mode in round wave guides.

19. Transmission system according to claim 18 wherein said wave beam producing means include means for producing field patterns similar to those of the $TM_{01}$ mode in round wave guides.

20. Transmission system according to claim 8 wherein said wave beam producing means include means for producing two linearly polarized fields transmitted simultaneously in directions of polarization which are perpendicular to each other.

21. Transmission system according to claim 8 wherein said wave beam is non-circular in cross section.

22. Transmission system according to claim 8 wherein said phase-correcting means are mounted in a wave-absorbing wall.

23. Transmission system according to claim 8 wherein the entire transmission system is enclosed in a dielectric tube.

24. Transmission system according to claim 8 wherein the entire transmission system is enclosed in a concrete tube.

25. Transmission system according to claim 8 comprising wave-deflecting means arranged in the path of the wave beam to cause deviation from a straight path.

26. Transmission system according to claim 25 wherein said wave-deflecting means are metal reflectors.

27. Transmission system according to claim 25 wherein said wave-deflecting means are dielectric wedges.

28. Transmission system according to claim 8 comprising a further number of phase-correcting means, arranged in cascade with said first phase-correcting means and having apertures substantially different from said first phase-correcting means to reset the phases of said beam at corresponding cross sections of substantially different diameter, a magnifying lens forming an enlarged image of the last phase-correcting means of the smaller of said cross sections at the plane of the first phase-correcting means of the larger of said cross sections, the diameter of said magnifying lens being large enough not to introduce any diffraction effects by restricting the passing beam.

29. Transmission system according to claim 28 wherein said last phase-correcting means is constituted by phase-correcting means of the same diameter as the other phase-correcting means of said smaller cross sections but of said focal length, if considered as a lens operating at wave lengths substantially below said aperture determining wave length, that said phase-correcting means images the plane of the preceding phase-correcting means of said wave front into the plane of said magnifying lens; the first phase-correcting means of said larger cross sections being constituted by phase-correcting means which image the plane of the succeeding phase-correcting means into the plane of said magnifying lens.

30. In a high frequency transmission system, means for producing a free electromagnetic wave beam with planar wave fronts progressing into a predetermined direction having at a predetermined point along its path a uniform cross-sectional phase distribution, and phase-correcting means arranged across said path following said point and having an aperture determined by the square root of the product of wave length and distance between said point and a further point to reset at said further point the cross-sectional phase distribution to a substantially uniform value.

31. In a high frequency transmission system, means for producing a free electromagnetic wave beam with substantially planar wave fronts progressing into a predetermined direction, having at a predetermined point along its path a substantially uniform cross-sectional phase distribution, phase-correcting means arranged across said path near said point for varying said cross-sectional phase distribution to a predetermined extent, and further phase-correcting means arranged across said beam at a further point along its path for resetting said varied phase distribution to a uniform cross-sectional phase distribution over substantially the same cross section, said phase-correcting means having apertures determined by the square root of the product of wave length and distance between said points.

32. In a method of transmitting electromagnetic waves, the steps of forming substantially planar electromagnetic wave fronts of predetermined field distribution progressing along a substantially linear path, and forming a substantially cylindrical wave beam by repeatedly compensating diffractional expansion of said wave fronts by repeated phase corrections at distances determined at a given wave length by the size of said wave fronts to maintain said wave fronts at substantially uniform cross sections.

33. In a method of transmitting electromagnetic waves, the steps of launching substantially planar electromagnetic wave fronts of predetermined amplitude distribution progressing into a predetermined direction and forming a substantially cylindrical wave beam by repeatedly reconverging said wave fronts at points of diffractional beam divergence by repeated phase corrections at distances determined by the product of the reciprocal of the wave length and the square of the radius of said wave fronts to maintain substantially said predetermined amplitude distribution.

34. In a method of transmitting electromagnetic waves, the steps of launching substantially planar electromagnetic wave fronts progressing into one predetermined direction, and forming a substantially cylindrical electromagnetic wave beam by repeatedly enforcing a predetermined cross-sectional phase distribution at successive cross sections along the path of said wave fronts at intervals determined at a given wave length by the areas of said wave fronts.

35. In a high frequency transmission system, means including a number of sources of electromagnetic wave energy, each producing within substantially the same cylindrical space substantially planar electromagnetic wave fronts progressing along the same path, each gradually expanding from predetermined points along said space in accordance with diffraction, and wave-refracting means arranged across said wave fronts at further points along said space at distances determined by the product of the reciprocal of the wave length and the square of the radius of said wave fronts to compensate said diffractional expansion.

36. Transmission system according to claim 35 wherein said wave fronts are propagated in the same direction.

37. Transmission system according to claim 35 wherein said wave fronts are propagated in opposite directions.

38. Transmission system according to claim 35 wherein said wave fronts are propagated in different wave modes.

39. Transmission system according to claim 35 wherein said wave fronts are propagated in different polarization planes.

40. In a method of transmitting electromagnetic waves, the steps of forming simultaneously within substantially the same cylindrical space a number of substantially planar electromagnetic wave fronts progressing along substantially the same linear path gradually expanding in accordance with diffraction, and forming a corresponding number of substantially cylindrical electromagnetic wave beams of substantially uniform cross section by repeatedly compensating said diffractional expansion at intervals determined at a given wave length by the size of said cross section.

References Cited in the file of this patent

UNITED STATES PATENTS

| | | |
|---|---|---|
| 2,129,712 | Southworth | Sept. 13, 1938 |
| 2,231,602 | Southworth | Feb. 11, 1941 |
| 2,415,352 | Iams | Feb. 4, 1947 |
| 2,464,269 | Smith | Mar. 15, 1949 |
| 2,494,645 | Collins | Jan. 17, 1950 |
| 2,547,416 | Skellett | Apr. 3, 1951 |
| 2,634,366 | Schimpf | Apr. 7, 1953 |
| 2,636,125 | Southworth | Apr. 21, 1953 |
| 2,643,336 | Valensi | June 23, 1953 |
| 2,651,715 | Hines | Sept. 8, 1953 |
| 2,705,753 | Jaffe | Apr. 5, 1955 |
| 2,747,184 | Kock | May 22, 1956 |
| 2,761,141 | Strandberg et al. | Aug. 28, 1956 |
| 2,784,641 | Keuffel et al. | Mar. 12, 1957 |
| 2,786,132 | Rines | Mar. 19, 1957 |

FOREIGN PATENTS

| | | |
|---|---|---|
| 576,444 | Great Britain | Apr. 4, 1946 |
| 956,777 | France | Aug. 15, 1949 |